US010362048B2

(12) United States Patent
Alexander et al.

(10) Patent No.: US 10,362,048 B2
(45) Date of Patent: Jul. 23, 2019

(54) DISTRIBUTED ONLINE WIRELESS SECURITY TEST SYSTEM

(71) Applicant: Ixia, Calabasas, CA (US)

(72) Inventors: Thomas Alexander, Mulino, OR (US); Lester Noel Stott, Aloha, OR (US); Kalyan R. Sundhar, Cary, NC (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 40 days.

(21) Appl. No.: 15/153,695

(22) Filed: May 12, 2016

(65) Prior Publication Data

US 2017/0331847 A1 Nov. 16, 2017

(51) Int. Cl.
*H04L 29/06* (2006.01)

(52) U.S. Cl.
CPC ...... *H04L 63/1433* (2013.01); *H04L 63/1408* (2013.01); *H04L 63/1441* (2013.01)

(58) Field of Classification Search
CPC ............. H04L 63/1408; H04L 63/1433; H04L 63/1441
USPC ........................................................ 726/25
See application file for complete search history.

(56) References Cited

U.S. PATENT DOCUMENTS

| | | | |
|---|---|---|---|
| 2007/0291650 A1* | 12/2007 | Ormazabal | ......... H04L 43/0852 370/244 |
| 2013/0347103 A1* | 12/2013 | Veteikis | .................. H04L 43/04 726/22 |
| 2017/0126726 A1* | 5/2017 | Han | ..................... G06F 9/45558 |

OTHER PUBLICATIONS

"IxLoad-IPsec Testing," Data Sheet Document No. 915-1769-01 Rev H, Ixia, pp. 1-13 (Aug. 2015).
"IxLoad EPC Wi-Fi Offload Testing," Data Sheet Document No. 915-1796-01 Rev B, Ixia, pp. 1-13 (Apr. 2015).
"PerfectStorm™ 40GE, High-Performance Application and Security Load Modules," Data Sheet Document No. 915-4026-01 Rev B, Ixia, pp. 1-10 (Apr. 2015).
"IxCatapult X800 and X100 Chassis," Data Sheet Document No. 915-2732-01 Rev B, Ixia, pp. 1-4 (Jun. 2014).

* cited by examiner

*Primary Examiner* — Kambiz Zand
*Assistant Examiner* — Benjamin A Kaplan

(57) ABSTRACT

Systems and methods are disclosed herein to provide improved online security testing of security devices and networks, including but not limited to networks containing wireless access points. In accordance with one or more embodiments and aspects thereof, a distributed online test system is disclosed that combines an online test manager with one or more remote probes to generate simulated attacks and verify their effectiveness. Such a system may offer improved capabilities such as the ability to conduct attacks over geographically distributed network topologies, the ability to assess the security functions of wireless networks, and simpler and more cost-effective online security testing.

18 Claims, 12 Drawing Sheets

DISTRIBUTED ONLINE WIRELESS SECURITY TEST SYSTEM

TECHNICAL FIELD

The subject matter described herein relates generally to data communication system security; and more particularly to systems and methods for assessing the security defenses of a network, with special reference to networks containing wireless access points.

BACKGROUND

Enterprise network security is a significant issue, as the rise of the Internet allows security attacks to be mounted on a large scale from anywhere in the world. It is common to find individuals and groups attempting to breach the security barriers at many large and small corporations in order to gain access to both sensitive customer data and internal business records, as well as to mount Denial of Service (DoS) attacks to hinder or cripple day-to-day operations. In response, enterprises employ sophisticated security mechanisms and install specialized security devices to thwart such breaches and attacks. Such security mechanisms and devices may range from simple network firewalls that act as walls to keep out intruders, to highly complex Intrusion Detection Systems and Intrusion Prevention Systems (IDS/IPS) that intercept and examine every packet traversing the corporate Internet access link to catch and eliminate these attacks.

FIG. 1 depicts a typical security defense scenario that may be implemented, for instance, at a corporate main office. As shown in FIG. 1, corporate main office 10 may be connected to the Internet 11 through security device 12 that may implement one or more network security measures, such as firewalling, intrusion detection and prevention, virus filtering, DoS prevention, etc. Security device 12 may pass analyzed and filtered traffic to router 13, which may be connected to LAN 14 on which may reside (for the purposes of illustration) protected device 15 and protected data 16. As represented in the figure, an outside attacker 17 may attempt to mount an attack 18 against the corporate main office 10. However, security device 12 may determine that an attack has been mounted, possibly by inspecting the network traffic arriving from Internet 11, and may thwart the attack by discarding packets from or to attacker 17 while still continuing to forward non-attack traffic.

The number of different types of attacks and exploits, however, are known to increase constantly as time progresses. Not only do attackers find new security vulnerabilities to penetrate, but the introduction of different kinds of software and new models of hardware expose new areas where attackers may focus. In addition, the configuration and maintenance of security devices (such as security device 12 in FIG. 1) is a complex and ongoing task. In response to new attacks becoming known, security devices may need to be reconfigured or updated with new firmware. Such reconfigurations or firmware updates may result in unexpected security vulnerabilities being introduced. Further, changes in the LAN topology or equipment (e.g., changes to router 13 or LAN 14 in FIG. 1) may create unexpected problems with security. As a consequence, it may be necessary to perform periodic security scans and assessments of the security devices and network equipment at an enterprise location. As it may not be practicable to shut down the enterprise while these scans are being performed, the systems and topologies may have to be tested while live traffic is running; i.e., it may be necessary to perform online testing of the security posture.

With reference to FIG. 2, a representation of a possible online test setup is depicted. Corporate main office 10 connected to Internet 11 with security device 12 interposed between Internet 11 router 13 may utilize online tester 20 to conduct periodic security assessments and determine that an adequate security posture is being maintained. Such attacks may simulate the effect of attack traffic arriving from Internet 11 and directed at protected device 15 or protected data 16, which are connected via LAN 14 to router 13. Attack simulation may be conducted by generating simulated attack traffic 23 from attack generator 21 within online tester 20. Attack traffic 23 may be injected into security device 12 on its Internet-facing side. If security device 12 is improperly configured or has unexpected vulnerabilities, some fraction of attack traffic 23 may be inadvertently allowed to pass through as "leaking" attack traffic 24. Attack checker 22 may simulate a protected entity, such as protected device 15 or protected data 16, and may receive the leaking attack traffic 24, and this may effectively indicate that an attacker could gain access to an actual protected device as a result. Online tester 20 may then determine the vulnerabilities of security device 12 by comparing the generated attack traffic 23 with leaking attack traffic 24, and may create a report detailing the problems. These problems in security device 12 may then be addressed and solved before an actual attacker attempts to penetrate the network from the Internet.

Online tester 20 may generally be caused to run simulated attacks and determine vulnerabilities from time to time, rather than on a continuous basis. For instance, online tester 20 may be set up to perform a simulated attack every night when the level of activity in corporate main office 10 is low. Alternatively (or in addition) online tester 20 may be set up to perform a simulated attack after a new software version has been loaded into security device 12 or router 13, or after the network or devices have been reconfigured. In general, the objective of using online tester 20 may generally be to detect and close off security "holes" before they become an actual problem.

Another possible capability of online tester 20 that may be deduced from FIG. 2 is the ability to test for exfiltration of data. In certain cases, it may be possible for an attacker to break through the defenses and reach LAN 14 with the known or unwitting co-operation of an existing user on the LAN; for example when a trusted computer used by an employee at corporate main office 10 has been infected with a virus, causing it to fetch protected data 16 and direct it towards an attacker waiting to receive it on Internet 11. Security device 12 may be configured to detect such exfiltration of data and intercept the traffic, thereby preventing the data loss. Online tester 20 may likewise be configured to verify that security device 12 is properly configured and functioning by simulating the signature of the data being exfiltrated (using attack generator 21), injecting traffic into router 13, and detecting (using attack checker 22) whether the exfiltrated data is observed at the Internet-facing side of security device 12.

The exemplary arrangement of corporate main office 10 defended by security device 12 may usually be sufficient when the only source of attacks is from a single point, viz. Internet 11. In this case, simply defending against attacks from that single point may be adequate to fully protect the resources on the internal network. However, the recent trend is to link one or more branch offices to corporate main offices via the internet using Virtual Private Networks (VPNs).

VPNs may be used to extend the internal network within the corporate main office to branch offices, such that users at either office may easily and efficiently gain access to all corporate resources and data. Unfortunately this may lead to significant limitations with regard to security testing, as compared to the scenario outlined in FIG. 2.

Turning to FIG. 3, a high-level view of a corporate main office 50 interconnected with a geographically remote branch office 51 through VPN 52 traversing the Internet 53 is depicted. Corporate main office 50 itself may be connected to the Internet (to permit employee access to Internet resources); this may be represented as a connection to Internet 67. (It should be understood that Internet 67 and Internet 53 are one and the same Internet, and are drawn separately for convenience in representation and explanation.) To defend against attacker 68 that may mount attack 69 from Internet 67, the corporate main office may install security device 55 to secure all traffic being sent to and from router 56, which maintains LAN 57 on which may reside protected device 58, protected data 59, and VPN device 60. VPN device 60 at corporate main office 50 may establish a VPN (an encrypted logical tunnel) 52 through Internet 53 to its counterpart VPN device 61 at branch office 51. VPN device 61 may be connected to branch office router 62, which may also connect to remote protected entities located at the branch office such as protected device 65 and protected data 66. The combination of VPN devices 60 and 61 along with the VPN tunnel 52 that they establish is used to link router 62 at the branch office with LAN 57 at corporate main office 50. This may have the desirable effect of allowing employees at corporate main office 50 to see protected data 66 and interact with protected device 65. It may also have the desirable effect of allowing employees at branch office 51 to interact with protected device 58 and see protected data 59 at corporate main office 50.

However, branch offices may frequently have other entities on their networks than simply router 62 with protected device 65 and protected data 66. For example, it may be advantageous to install wireless access point (AP) 64 to provide branch office employees with wireless access to the complete corporate network. This may then open up a new point of vulnerability in the corporate enterprise: attacker 70 that possesses a wireless device 71 and located in proximity to branch office 51 may be able to mount attack 72 over the wireless link to AP 64, in order to try to gain unauthorized access to protected device 65 and protected data 66. In fact, due to the existence of VPN tunnel 52 linking branch office 51 with corporate main office 50, attacker 70 (if successful) may gain access to the entire corporate network and resources through a successful attack on AP 64.

To guard against this possibility, a second security device 63 may be interposed between access point 64 and router 62. Security device 63 examines all traffic arriving from and destined to wireless AP 64 (and thence to the wireless LAN), and intercepts and discards known attack traffic while letting normal traffic pass. In this case, attack traffic 72 from attacker 70 is intercepted and prevented from reaching router 62, foiling the attack.

However, it is apparent from FIG. 3 that a serious problem may exist with regard to analyzing and reporting the security posture of the overall system by an online test approach such as that exemplified in FIG. 2. Firstly, the existence of AP 64 may create a new type of entry point for attack: a wireless entry point. Unlike security device 55 (or security device 63) which has wired ports and thus may be easily connected to an online tester, such as online tester 20 in FIG. 2, the entry point for attacks created by AP 64 may not easily addressed by an online tester. Secondly, the physical separation between corporate main office 50 and remote branch office 51 may make it very difficult to assess the overall security posture of the corporate network. No known approach in the prior art permits the attack traffic generated by an online tester, such as by attack generator 21 of online tester 20 in FIG. 2, to be caused to traverse the complete network represented in FIG. 3 and still return to an attack checker, such as attack checker 22 in FIG. 2. However, without completing the loop and checking the generated attacks, it may not be possible to determine which attacks have succeeded and which attacks have failed. Yet at the same time, it may be highly desirable to test the complete security system formed by security device 63 and router 62 in conjunction with security device 55 and router 56.

Turning now to FIG. 4, another issue is illustrated that may arise from the need to provide direct Internet access at the branch office. This may be driven by the need to conserve bandwidth on the VPN tunnel joining two sites, as well as the reduce the load on the Internet uplink at the corporate main office; rather than direct normal Internet traffic through the VPN tunnel, this traffic may be bypassed directly to the Internet at the branch office. For example, FIG. 4 may represent a corporate main office 50 and remote branch office 51 interconnected over Internet 53 via VPN tunnel 52, established between VPN devices 60 and 61. Branch office 51 may, however, have its own connection to Internet 81 to avoid sending direct Internet traffic down VPN tunnel 52. In this case, only the internal corporate traffic may need to traverse the VPN tunnel.

To prevent the direct connection to Internet 81 at the branch office from becoming a security hazard, however, security device 80 may be interposed between branch office router 62 and Internet 81 to intercept and filter traffic to and from the Internet. This may foil attacker 82 which may be directing attack traffic 83 at branch office 51. In addition, security device 55 may be interposed between corporate main office router 56 and Internet 67, to stop attack traffic 69 originating from attacker 68 from reaching LAN 57 and thereby compromising protected device 58 and protected data 59. Finally, security device 63 may be placed at branch office 51 between router 62 and wireless AP 64 to defend against attacker 70 with wireless device 71 from mounting attack 72 wirelessly. (It should be noted that Internet 67, Internet 53 and Internet 81 are all logically the same Internet, but are drawn as three separate elements for representational clarity and to simplify the description.)

The presence of security device 80 to defend against attacks from direct branch office connection to Internet 81 may add yet another dimension to the problem of online security attack testing. It may be desirable to determine whether security device 80 may prevent the exfiltration of data from branch office 51 to the Internet 81, should attacker 70 successfully mount attack 72 through wireless AP 64. For example, security device 80 may be configured to determine when protected data 66 is being exfiltrated to Internet 81, and intercept and prevent the exfiltration. This may, however, be very difficult to test with an online tester without physically locating the tester at remote branch office 51. However, the cost and complexity of an online tester, such as online tester 20 in FIG. 2, may render this prohibitively expensive. This may be particularly true in situations where there are hundreds or thousands of relatively small remote branch offices associated with one or a few corporate main offices.

A significant limitation of online testers as known in the art is the difficulty of separating the attack generation function from the attack checking function. It may not be possible to generate anything more than a trivial "stateless" security attack without significant synchronization and linkage between the attack generation and the attack checking. High-level security attacks may require complex sequences of packet handshakes, wherein the next packet to be transmitted depends on the last packet that was received; thus the packet sequence is dictated not only by the properties of the attack being conducted but also by the response of the device or network under test, such as security device 12 in FIG. 2. Thus physically separating attack generator 21 from attack checker 22 in online tester 20 in FIG. 2 is not practical using the methodologies heretofore known. However, such a physical or logical separation is required for the case of remote branch offices, where the source of the attack may be geographically separated from the target of the attack.

It may be apparent from the foregoing discussion that current methods of performing online security posture testing may not be adequate for network topologies involving a corporate main office and one or more remote branch offices interconnected by means of VPNs. Current methods may result in excessive cost or complexity when attempting to perform such testing, and may be very difficult to implement without expensive equipment and trained personnel being physically present at the remote branch office. It may further be apparent that current techniques for online security testing may not be easily applicable to remote branch offices containing wireless access points. It may yet further be apparent that current approaches to online security testing may be difficult to apply to remote branch offices that may provide direct connections to the Internet in addition to VPN tunnels to the corporate main office.

There is hence a need for improved online security testing systems and methods.

SUMMARY

A system that can perform distributed online testing of the security posture of a topology comprising one or more corporate main offices interconnected with one or more remote branch offices may be desirable. A distributed online test system providing improved ability to test the security of remote branch offices containing wireless access points may be desirable. Further, a distributed online test system that can test the ability of security devices at remote branch offices to prevent the exfiltration of data may be desirable. Such a system may preferably be controlled and managed from a central site (e.g., the corporate main office). Finally, it may be desirable for such a system to be realized without excessive cost and complexity.

Systems and methods are disclosed herein that may provide improved techniques for testing of data communications devices and systems that defend against security attacks, particularly in the context of system topologies involving wireless access points. Such techniques may enable the improved testing of security devices at branch offices interconnected with corporate main offices. The systems and methods disclosed may further improve the online security testing of networks that have direct connections to the Internet at remote points.

In accordance with one embodiment, a distributed online test system is disclosed that may enable a distributed online security test capability for assessing the security posture of a topology comprising a corporate main office and one or more branch offices. The online test system may contain: an online test manager device, which may include a simulated attack manager, a simulated attack terminator, and an encapsulation function, together with a user interface; and a remote probe, which may include a simulated attack generator and checker with network test interfaces, in conjunction with simulated attack control and decapsulation functions.

The distributed online test system may be operative to configure, control and execute online simulated security attacks, determine whether attack traffic is able to penetrate the network being tested, assess the success of simulated attacks, and save results indicating the security posture of the network under test.

The distributed online test system may utilize a tunnel between the online test manager and the remote probe to carry both control information as well as encapsulated attack packets that have penetrated through the network security barriers. The online test manager may preferably include a master attack database that may store data pertinent to one or more types of simulated attacks, and may download the relevant attack data to the remote probe to be temporarily stored in a local attack database prior to starting the attack traffic.

The distributed online test system may further include a remote attack reflector that may be located in a distant location such as a site on the Internet or a virtual location such as on a virtual machine in a compute cloud. The remote attack reflector may function in conjunction with the remote probe to test the capacity of the branch office security devices to resist attempts to exfiltrate data by setting up simulated exfiltration scenarios and determining whether the test data is successfully exfiltrated.

The remote probe may utilize a wireless interface coupled to the simulated attack generator to mount simulated attacks against wireless access points or other wireless elements that are part of the network being tested.

The distributed online test system may operate using the same VPN links that are established between the corporate main office and one or more branch offices. Both the control and the reflected attack data may be passed using dedicated tunnels over the VPN links.

The remote probe may simultaneously inject simulated attack traffic into the wireless access points and the wired switches or routers that are part of the same LAN. This may lead to improved flexibility of the distributed online test system, by increasing the range of tests that can be conducted and detecting problems at multiple points within the LAN.

In accordance with an aspect of the subject matter described herein, simulated attack traffic that has penetrated the protective devices on the LAN are received by the online test manager from the security device or LAN router, encapsulated, and returned to the remote probe for processing via a dedicated tunnel. This may have the benefit of simplifying the process of generating and checking attacks, by allowing a single attack generator and checking function to both generate and verify attack traffic.

In accordance with an aspect of the subject matter described herein, the remote probe may be deployed at the same geographical site as the online test manager, for example at a corporate main office. This may allow increased flexibility of online security testing by allowing wireless access points to be included in the tests, as well as enabling the entire LAN to be tested as a whole.

One aspect of the subject matter described herein includes a distributed security tester for a SUT. The distributed security tester includes a probe including at least one processor. The distributed security tester further includes an attack generator and checker implemented by the at least one processor, and operative to generate simulated attack traffic for injection into said SUT for simulating a security attack on said SUT, and further to process simulated attack traffic that has passed through said SUT. The subject matter described herein further includes an attack terminator operative to receive from said SUT said simulated attack traffic that has passed through said SUT and operative to return, via a tunnel, said simulated attack traffic that has passed through said SUT from said attack terminator unit to said attack generator and checker. The attack generator/checker is configured to operate in a separate physical location from said attack terminator.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The detailed description herein of the features and embodiments are best understood when taken in conjunction with the accompanying drawings, wherein.

It should be understood that like reference numbers are used to identify like elements illustrated in the different drawings.

DETAILED DESCRIPTION

Figure 5:
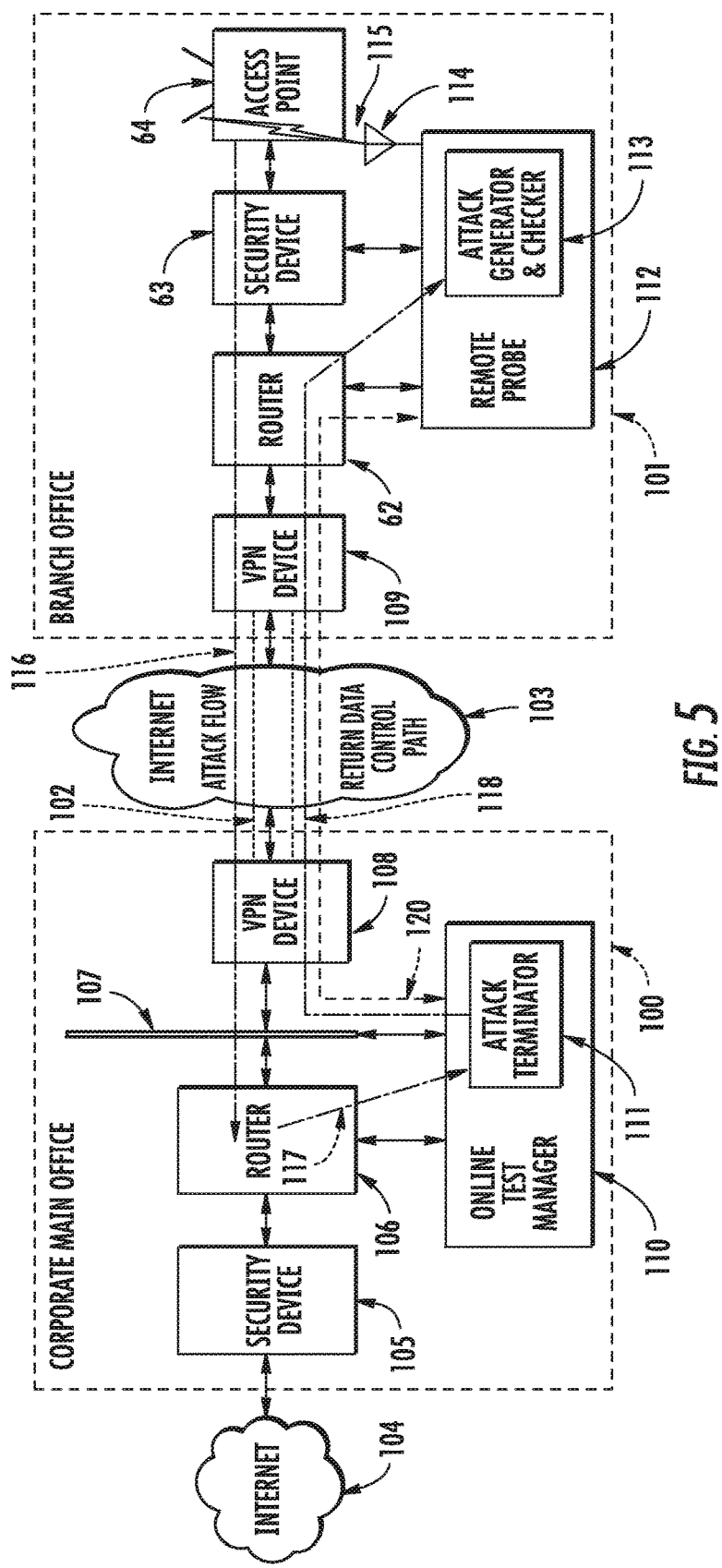
FIG. 5 depicts a high-level representation of a remote probe used in conjunction with an online test manager to assess the security posture of a corporate branch office.

With reference to FIG. 5, an embodiment of a distributed online test system that may be capable of assessing the security posture of a corporate main office 100 interconnected with a remote branch office 101 via a VPN link 102 traversing the Internet 103 is shown. For illustrative purposes, the corporate main office may be assumed to be also connected to Internet 104 through security device 105. Main office router 106 may connect LAN 107 to security device 105; protected devices and data (not shown) may be located on LAN 107. VPN device 108 may also be connected to LAN 107 to support VPN link 102, which may be connected to a corresponding VPN device 109 at remote branch office 101. Branch office router 62 may interface VPN device 109 to the LAN (not shown) at branch office 101. Branch office 101 may also include security device 63 which connects to wireless access point (AP) 112, which may provide wireless access to the employees located at branch office 101. By virtue of VPN link 102, employees at corporate main office 100 may be able to access resources at remote branch office 101, and vice versa A security test of such a geographically distributed topology may be accomplished by placing online test manager device 110 at corporate main office 100, coupled via control path 120 to remote probe device 112 at the remote branch office. Remote probe 112 may generate simulated attack traffic via attack traffic generator and checker 113, and may be equipped with antenna 114 to direct attack traffic 115 to access point 64. Access point 64 may accept attack traffic 115 and forward it to security device 63. Security device 63 may intercept and examine the simulated attack traffic, and, if it matches signatures or attributes of known attack vectors, may drop or quarantine the attack traffic. If security device 63 properly detects the attack traffic, the traffic will not reach corporate main office 100; however, if security device 63 is unable to detect the nature of the simulated attack traffic, it may unwittingly forward the simulated attack traffic as attack flow 116 over VPN link 102 to corporate main office 100. The simulated attack flow 116 may reach router 106 and may be forwarded as flow 117 to attack terminator 111 within online test manager 110. Attack terminator 111 may then receive the packets on flow 117 and pass them to an encapsulation function (illustrated in FIG. 7), which suitably encapsulates them and forwards them as return data 118 destined for attack generator and checker 113. This encapsulated return data 118 may traverse the same VPN link 102 that interconnects corporate main office 100 and remote branch office 101. Branch office router 62 may then forward encapsulated return data 118 to attack generator and checker 113, which may then compare the return data to the known simulated attack traffic and determine which attacks may not have been blocked by security device 63. This determination may in turn be used to produce a report of the security posture and compliance of the network.

It may be noted that in the arrangement of FIG. 5, attack traffic 115 created by attack generator and checker 113 may be regarded as having been "looped" back to attack generator and checker 113, which may then be enabled to process the generated traffic concurrently with the checked traffic. This may eliminate the problems arising from a physical separation of the traffic generation and traffic checking functions. Both functions may now be performed within the same block, which may greatly simplify the design and implementation of the attack generator and checker 113.

Attack terminator 111 may serve as the predefined target of simulated attack traffic 115 generated by attack generator and checker 113. As the attack traffic may be entirely generated and terminated by the distributed online test system formed by the combination of online test manager 110 and remote probe 112, it may be simple for online test manager 110 to instruct remote probe 112 to generate and inject attack traffic to known target addresses within the corporate main office, viz. the destination address of online test manager 110 itself. Online test manager 110 may establish a control path 120 to remote probe 112 for this and other purposes. Control path 120 may be used by online test manager 110 to initialize remote probe 112, download attack generation and checking commands to it, start tests by initiating attack traffic 115, and read results that are to be analyzed and provided to the users of the distributed online test system.

Figure 6:
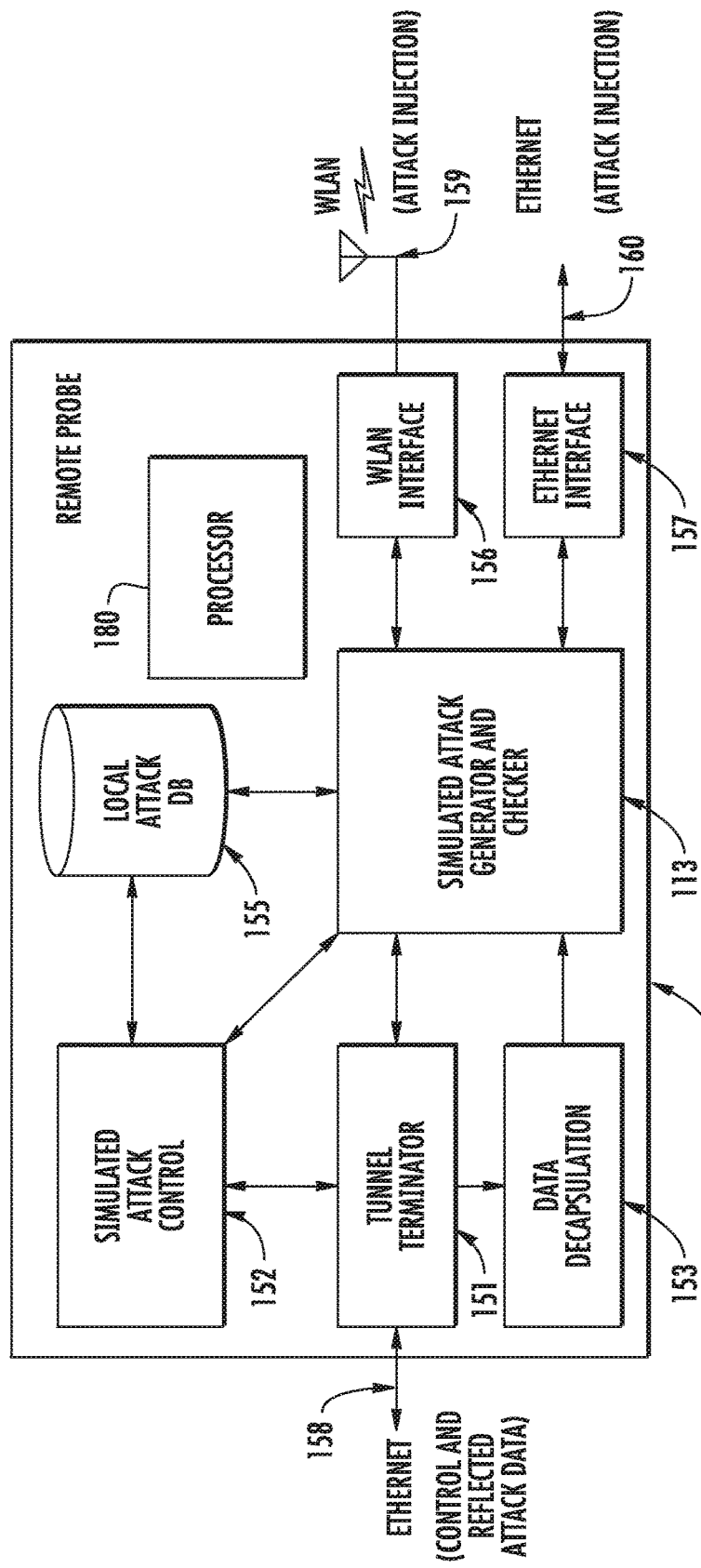
FIG. 6 is illustrative block diagram of a remote probe that may inject attacks into a wireless and a wired LAN.

Turning now to FIG. 6, an illustrative block diagram of a remote probe 150 is depicted, comprising simulated attack generator and checker 113 which may receive attack profiles and data from local attack database (DB) 155, and may output generated attacks over wireless LAN (WLAN) interface 156 and/or Ethernet LAN interface 157. WLAN interface 156 may inject attack traffic into a wireless network device, such as a wireless AP (for example, AP 64 in FIG. 5), using wireless antenna 159. Ethernet interface 157 may likewise inject attack traffic into a wired network device (e.g., security device 63 in FIG. 5) using wired Ethernet cable 160.

Remote probe 150 may further contain tunnel terminator 151 interfaced to the Ethernet LAN via Ethernet cable 158, which may form the remote endpoint of a dedicated control and data tunnel established between remote probe 150 and its controlling online test manager. Tunnel terminator 151 may receive both control traffic (e.g., control traffic 120 from online test manager 110 in FIG. 5) as well as encapsulated return attack data traffic (e.g., return data traffic 118 from attack terminator 111 in FIG. 5). Tunnel terminator 151 may forward control traffic to simulated attack controller 152, which may process and interpret commands contained within the control traffic and may load local attack DB 155 with attack profiles to be executed, or may instruct attack generator and checker 113 to set up and commence injecting attack traffic. Tunnel terminator 151 may also forward encapsulated return attack data traffic to data decapsulation function 153, which may decapsulate the return traffic and forward it to attack generator and checker 113, which may in turn process the return traffic to determine if an ongoing simulated attack has succeeded. Finally, tunnel terminator 151 may also forward attack results and status indications produced by attack generator and checker 113 to the controlling online test manager, so that the online test manager can create reports summarizing security posture. Remote probe 150 may include at least one processor 180 on which tunnel terminator 151, simulated attack controller 152, data decapsulation function 153, and simulated attack generator and checker 113 are implemented or execute.

The presence of local attack DB 155 in remote probe 150 may simplify the functions of attack generator and checker 113, and may also reduce the amount of traffic exchanged between the controlling online test manager and remote probe 150. Rather than continually receive instructions (e.g., on a packet-by-packet basis as the attack proceeds) from its controlling online test manager, remote probe 150 may consult its local attack DB 155 to determine the packet sequence and pass/fail indications. Thus, after local attack DB 155 has been preloaded with the desired attack profile(s), remote probe 150 may function autonomously and complete all of its tasks without further burdening the LAN. It is understood that local attack DB 155 holds only a subset of the complete set of attacks that may be supported by the system. This may reduce the hardware footprint of remote probe 150, and further may simplify the problem of maintaining and updating the attack profiles, by centralizing the primary repository of attack profiles within the online test manager.

Figure 7:
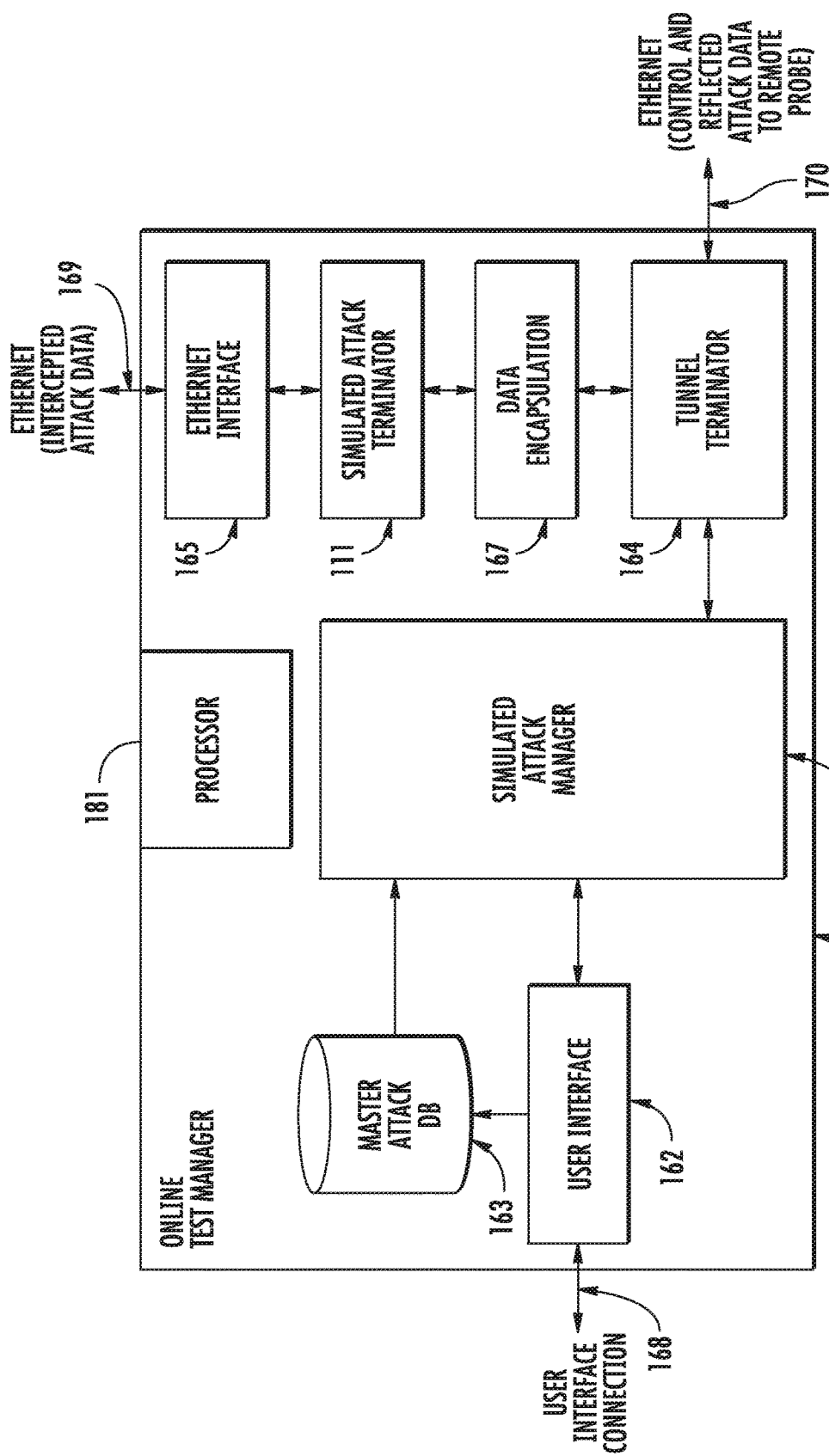
FIG. 7 is an exemplary block diagram of an online test manager.

As indicated in FIG. 5, remote probe 112 may perform all of its operations under the control of an online test manager, such as online test manager 110 in the block diagram of FIG. 7. Online test manager 110 may contain: simulated attack manager 154, that may exercise high-level control and management of the complete test system; user interface 162, that may allow users of the system to initiate testing and obtain results via user interface connection 168; master attack DB 163, that may hold the complete set of attacks available to be conducted, and from which subsets may be downloaded to remote probes; tunnel terminator 164, which may allow simulated attack manager 154 to transmit and receive control data to remote probes via dedicated tunnels, and may also allow attack data to be encapsulated and returned; Ethernet interface 165, that may accept intercepted attack data from wired security devices or routers/switches via Ethernet connection 169; simulated attack terminator 111 that may act as a termination point for simulated attack traffic; and data encapsulation function 167, that may encapsulate the simulated attack traffic prior to transmission to remote probe 112 by tunnel terminator 164. Data encapsulation function 167 may also encapsulate simulated attack traffic that has passed through the system under test into tunnel packets for return to attack generator and checker 113 via a tunnel. Online test manager 110 may include at least one processor 181 on which simulated attack manager 154, user interface 162, tunnel terminator 164, simulated attack terminator 166, and data encapsulation function are implemented or executed.

In operation, online test manager 110 may accept user commands at user interface 162, and may act on them to select a subset of the available attack profiles in master attack DB 163 and download this subset to the local attack DB in one or more remote probes (such as local attack DB 155 in remote probe 112 in FIG. 6). Download of attack profiles may occur over a control path established within the dedicated tunnel between online test manager 110 and each remote probe that it controls. After online test manager 110 has downloaded the desired subset of attack profiles, it may command the remote probe(s) to begin processing these profiles and injecting and processing attack traffic. While the remote probe(s) are in operation, online test manager 110 may monitor the progress of the simulated attack, possibly providing feedback to the user via user interface 162 as to the status. When the desired set of attacks has been completed, online test manager 110 may receive attack results and status indications from the remote probe(s) and may utilize them to assess the security posture and generate reports that may be passed to the user via user interface 162. As the simulated attack traffic may be injected into a wireless AP by wireless interface 156 and antenna 159 of FIG. 6, it is therefore possible to test the ability the WLAN (e.g., the combination of wireless AP 64 and security device 63 in FIG. 5) to detect and prevent security breaches by wireless attackers.

It may generally be necessary to encapsulate the terminated and returned attack traffic using some form of encapsulation process (e.g., IP-in-IP encapsulation, Generic Routing Encapsulation, etc.) to obscure it from security devices and firewalls in between the online test manager and remote probe. Such methods of encapsulation are well known in the art and will not be discussed further herein. Obscuration may further involve compressing the attack traffic and possibly encrypting it prior to encapsulation. If the returned attack traffic is not obscured and encapsulated, it may trigger security filters in intervening devices (e.g., router 62 in FIG. 5) that may quarantine or drop the traffic. This may prevent the attack traffic that successfully penetrated security devices from being processed by simulated attack generator and checker 113 in FIG. 6, and may result in false indications of security. Further, compressing the returned attack traffic may beneficially reduce the overhead placed on VPN tunnels established between a main office and a remote office, and mitigate the impact of running simulated attacks on a network carrying live traffic. Methods of compressing and encrypting traffic are likewise well known in the art, and will not be discussed herein.

It should be appreciated that one online test manager 110 may control more than one remote probe 112 at a time. It may only be necessary for online test manager 110 in this situation to open multiple dedicated tunnels, one to each remote probe 112, and also to provide termination for multiple intercepted streams of attack data, one from each remote probe 112. In this manner, it may be possible to perform testing of the security posture at multiple remote sites, either concurrently or serially. At the conclusion of the test process, it may be possible for online test manager 110 to provide a composite or aggregated test report to the user, detailing both the security posture of the overall network (i.e., the corporate main office and all of the remote sites taken as a whole) as well as separate issues that may have been found at each individual remote site.

The attack profiles in master attack DB 163 within online test manager 110 may need to be periodically updated, as new security issues are found and new attack vectors are developed. This may also be done through user interface connection 168, for example by enabling the download of attack profiles to master attack DB 163 over the Internet via a secured connection to a centralized repository. As a subset of attack profiles in master attack DB 163 may be selected and downloaded to the local attack DB within each remote probe prior to the start of a sequence of attacks, the remote probes may always be kept up to date with the latest set of attack profiles without requiring a separate process of updating their local databases. This may greatly simplify the process of maintaining and frequently updating attack profiles.

Figure 8:
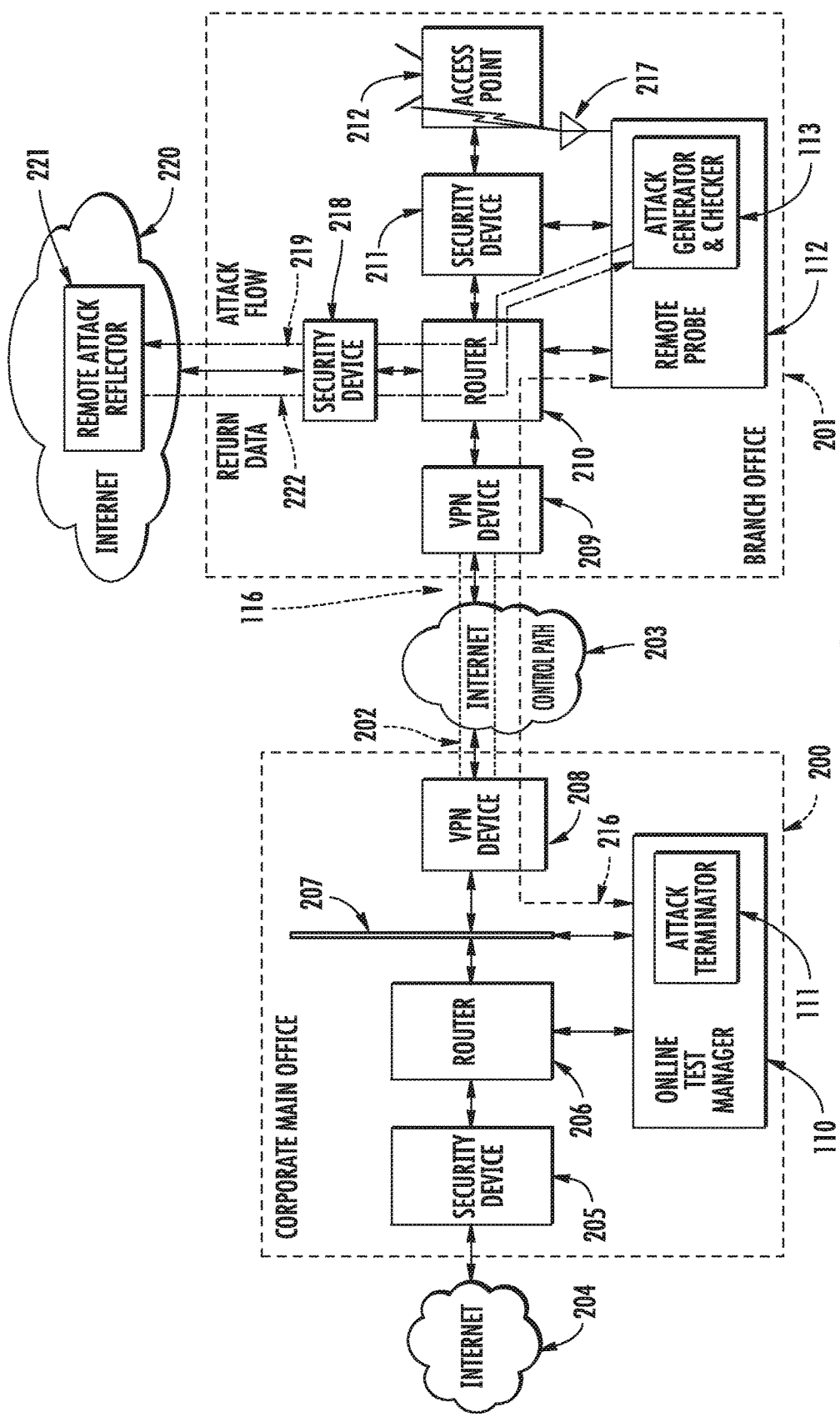
FIG. 8 shows a simplified representation of a remote attack reflector used in conjunction with a remote probe and online test manager.

In accordance with another aspect of the subject matter described herein, FIG. 8 shows corporate main office 200 that may be connected to remote branch office 201 via a VPN tunnel 202 over Internet 203. Both corporate main office 200 and remote branch office 201 may have their own separate connections to the Internet, indicated as 204 and 220 respectively. (It is understood that Internet 203, 204 and 220 all represent the same Internet, and are drawn separately for convenience and clarity.) Security device 205 may be used to defend corporate main office 200 from attacks conducted over the Internet, and may connect to router 206, which in turn may connect to LAN 207, which may support VPN device 208 as an endpoint for VPN tunnel 202. In the case of remote branch office 201, VPN device 209 is an endpoint for VPN tunnel 202 (connecting it to corporate main office 200), which may connect to router 210. Wireless access at remote branch office 201 may be provided by wireless AP 212, which may be isolated from the LAN and router by security device 211 to defend against wireless attackers. Access to Internet 220 may be secured by security device 218, which may prevent attackers from gaining access to router 210 over the Internet. Security device 218 may also be configured to prevent sensitive data from being exfiltrated to the Internet through router 210.

The security posture of the network in FIG. 8 may be tested by the combination of online test manager 110, that may be located at corporate main office 200; remote probe 112 containing attack generator and checker 113, that may be located at remote branch office 201; and remote attack reflector 221, that may be located on a server in the Internet (for example, Internet 220). Online test manager 110 may establish a control path 216 to remote probe 112 that may be used to download attack profiles of simulated attacks to perform, as well as to initiate attacks and obtain their results. Remote probe 112 may load these attack profiles into attack generator and checker 113, which may generate attack flow 219 that may be injected into security device 211 and thence to router 210. (Note that attack flow 219 may also be injected directly into router 210 if so desired.) Attack flow 219 passes through security device 218, which may be configured to detect the attack flow and possibly drop or quarantine the traffic. If security device 218 does not detect or stop the flow, however, it may proceed to Internet 220, where it may be terminated by remote attack reflector 221. Remote attack reflector 221 may then process, encapsulate, and return the terminated data to remote probe 213 as return data 222. Return data 222 may then be processed by attack generator and checker 113 to determine the success or failure of each simulated attack. Note that online test manager 110 may contain an attack terminator 111, but in this situation attack terminator 111 is not used.

Such an arrangement as represented in FIG. 8 may be used for testing the ability of security device 218 to detect and prevent the exfiltration of data from a protected network of branch office 201. The network of branch office 201 may be considered protected in that certain types of traffic may be prohibited from entering and leaving the network by one or more security devices positioned at network ingress and egress points. For instance, if an attacker should gain control of a trusted device within remote branch office 201 (e.g., by utilizing an e-mail virus to compromise a computer attached to router 210), the attacker may use this to transmit protected data from remote branch office 201 or from corporate main office 200 (over VPN link 202) out to Internet 220. Security device 218 may be designed to detect and avert this by examining outbound traffic for Internet 220 for known attack signatures or the existence of protected data, and may block the traffic if detected. Attack generator and checker 113 may therefore be configured to simulate the effect of an attacker that is attempting to exfiltrate protected data, represented by attack flow 219; presumably if security device 218 is functioning correctly, attack flow 219 will be detected and blocked, and will not reach remote attack reflector 221. Thus, attack flow 219 may contain simulated exfiltration traffic, such as traffic containing data files with fake personal identification information or other simulated confidential information. Attack generator and checker 113 in conjunction with remote attack reflector 221 may therefore form a distributed security tester under the control of online test manager 110. Note that remote attack reflector 221 may be controlled by remote probe 112, which in turn may be controlled by online test manager 110.

Figure 9:
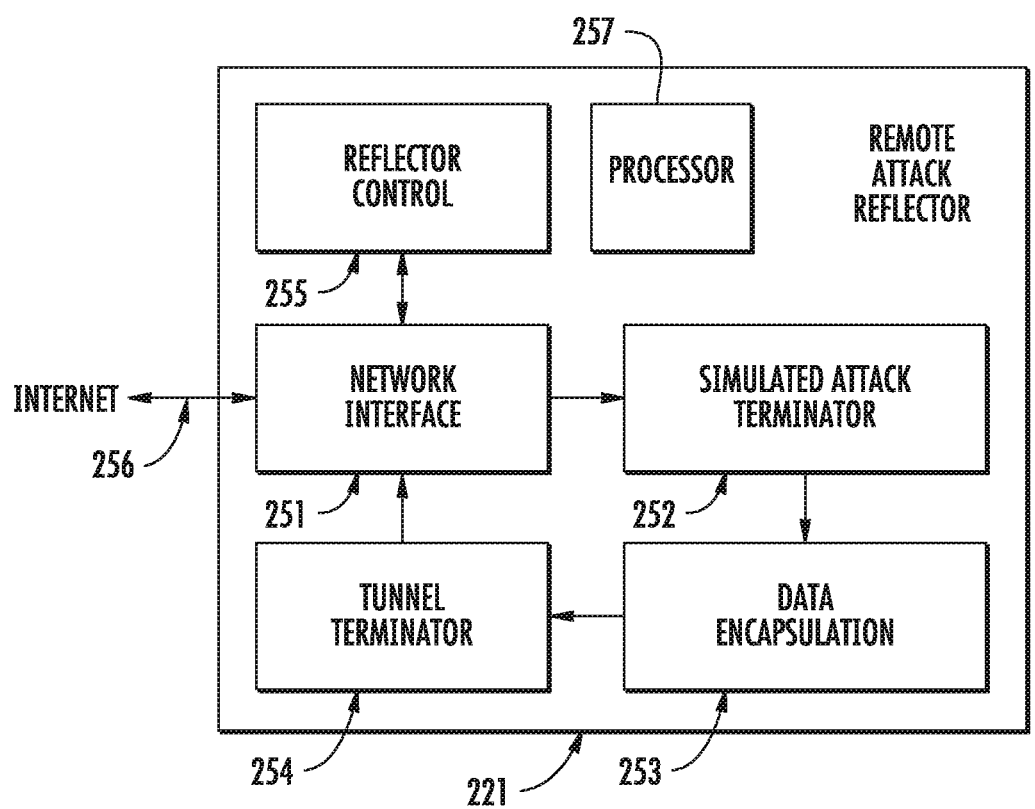
FIG. 9 depicts a possible block diagram of a remote attack reflector that is configured to receive security test attack packets that are forwarded by the SUT.

FIG. 9 depicts a possible block diagram of remote attack reflector 221, such as may be suitable for deployment in the Internet. Remote attack reflector 221 may include network interface 251 (which may be any suitable network interface, such as an Ethernet interface), which may pass attack traffic received from Internet link 256 to simulated attack terminator 252. Simulated attack terminator 252 may then terminate the attack traffic and pass the packets to data encapsulation function 253, which may encapsulate the attack traffic in any manner, such as that previously described. Encapsulated traffic may be passed to tunnel terminator 254, which may constitute the endpoint of a dedicated tunnel established from a remote probe (e.g., from tunnel terminator 151 in remote probe 150 shown in FIG. 6). Tunnel terminator 254 then passes the data to network interface 251 for eventual transmission back to remote probe 112 via Internet connection 256.

Control traffic that may control and configure remote attack reflector 221 may be received via Internet link 256 and passed by network interface 251 to reflector control 255. Reflector control 255 may be responsible for configuring remote attack reflector 221, setting up the proper addressing for simulated attack terminator 252, and commanding tunnel terminator 254 to accept and terminate incoming connections from remote probes. It should be appreciated that remote attack reflector 221 may not store any attack profiles or process attack data to determine if attacks have succeeded; instead, it merely receives, terminates and returns ("reflects") attack traffic data back to the originating remote probe for processing. Remote attack reflector 221 may include at least one processor 257 on which simulated attack terminator 252, data encapsulation function 253, tunnel terminator 254 are implemented or executed.

Figure 10:
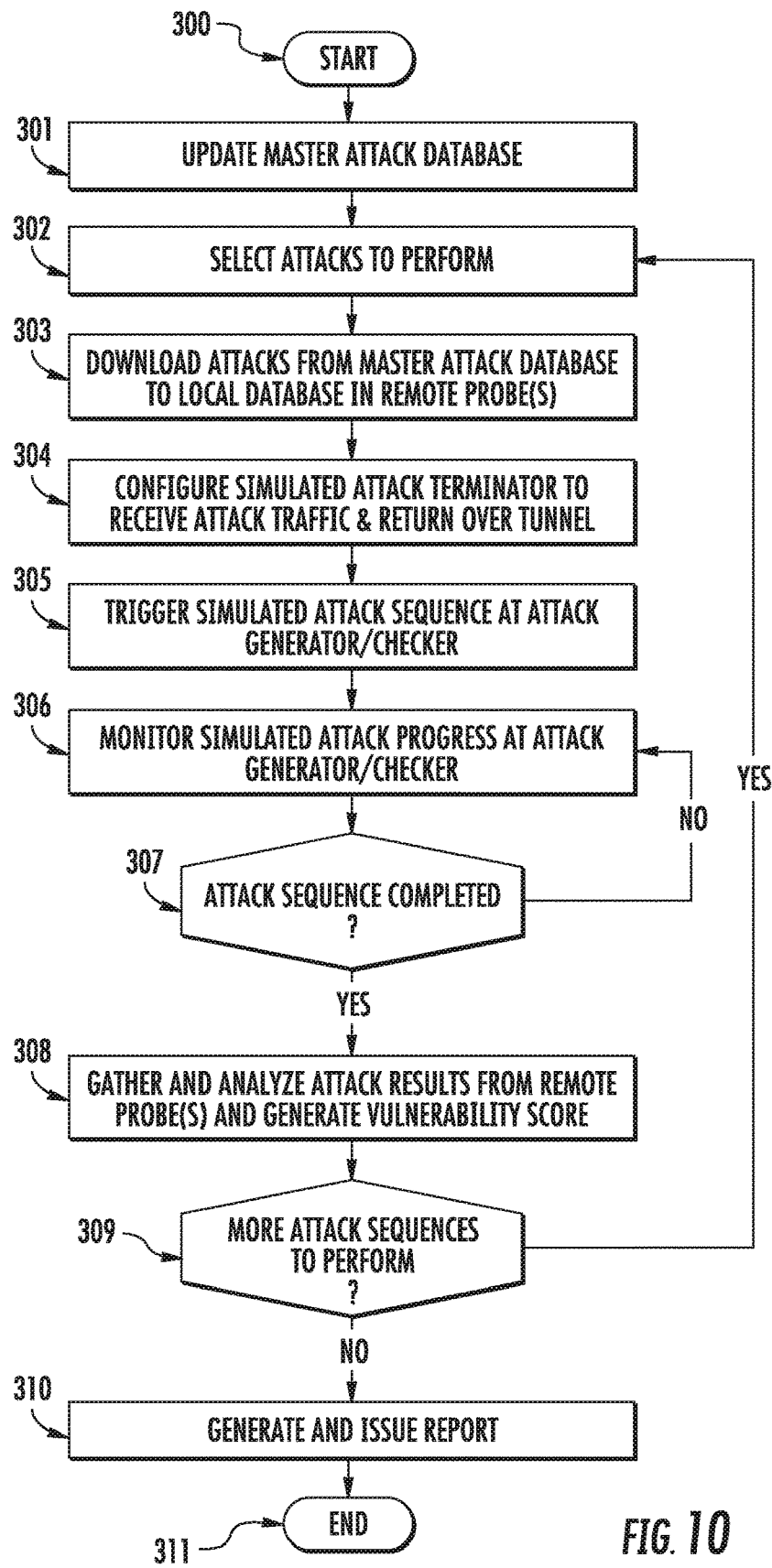
FIG. 10 provides a flow chart exemplifying a method of determining and reporting the security posture of an enterprise.

FIG. 10 depicts a flow chart for an exemplary procedure for performing simulated attacks and assessing security posture.

At step 300, the procedure starts. The procedure may be started by a test engineer starting online test manager 110 in one location and starting remote probe 112 in a separate physical location, such as a geographically separate network from the network in which online test manager 110 is located.

At step 301, a master database located within an online test manager is updated, possibly including downloading attack profiles and parameters from a central repository over the Internet. For example, master attack database 163 of online test manager 110 illustrated in FIG. 7 may be updated by a user downloading attack profiles to database 163 via user interface 162. The attack profiles may include data for generating simulated security attacks and data exfiltration attacks.

At step 302, attacks to perform during the test are selected, including accepting user input as part of the test selection. For example, a user, such as a test engineer, may select attacks to perform from those present in database 163 via user interface 162.

At step 303, the attacks and attack parameters are downloaded from a master database within an online test manager to a local database in one or more remote probes. For example, attacks selected by the user from master attack database 163 of online test manager 110 may be downloaded to and stored in local attack database 155 of remote probe 112 illustrated in FIG. 6.

At step 304, an attack terminator is configured to receive simulated attack traffic from the remote probe(s) and to return the simulated attack traffic to the remote probe(s) over a tunnel. For example, attack terminator 111 of online test manager 110 is configured to receive simulated attack traffic that passes through the system under test and to return the simulated attack traffic to remote probe 112 over a tunnel.

At step 305, the simulated attack sequence is triggered by issuing one or more commands to an attack generator/checker(s) in one or more remote probes. For example, online test manager 110 may trigger a simulated attack sequence by issuing triggering commands to attack generator and checker(s) 113 associated with one or more remote probes 112.

At step 306, the simulated attack progress is monitored by querying the attack generator/checker(s) in the remote probe(s). For example, online test manager 110 may monitor the progress of an attack by sending attack status queries to attack generator and checker(s) 113 associated with one or more remote probes 112.

At step 307, it is determined whether the attack sequence has been completed by all of the remote probes involved in the test, and, if not completed, control returns to step 306 to query again. For example, online test manager 110 may determine whether all of the remote probes 112 have completed their respective attack sequences by periodically issuing queries to the probes. The queries may continue until all of the probes have responded indicating completion of their simulated attacks.

At step 308, after the attack sequence has been completed, attack results are gathered from the different remote probes and analyzed to determine which simulated attacks successfully penetrated the security devices, and a vulnerability score is generated. For example, each attack generator and checker 113 may communicate attack results of its respective attack to online test manager 110, and online test manager 110 may generate a vulnerability score. The vulnerability score may be indicative of the percentage of attack or exfiltration packets that successfully passed a security device, versus the total number of packets in an attack. A vulnerability score may be generated for each remote probe so that the geographic vulnerability of each site may be separately assessed. Online test manager 110 may also generate a composite vulnerability score by computing a statistical measure, such as an average, of the vulnerability scores of each site. In an alternate embodiment, each attack generator and checker 113 may generate its own attack vulnerability score and communicate the vulnerability score to online test manager 110.

At step 309, it is determined whether more attack sequences need to be performed, and, if so, control returns to step 302 to select and perform the next attack. For example, online test manager 110 may determine whether all of the simulated attacks implemented by all of the remote probes have completed. If more attacks remain to be performed, control returns for step 302 for the next attack. If all of the attacks have been completed, control proceeds to step 310.

At step 310, after all the desired attack sequences have been performed a report is generated and issued to the user of the test system. For example, online test manager 110 may generate a report that indicates the results of each attack sequence. The report may include raw statistics for each attack sequence, such as the number of malicious packets that make it through a security device, versus the total of number of packets transmitted to the security device. The report may include a vulnerability score for each remote site, so that the report conveys vulnerability on a geographic basis. The report may also include a composite vulnerability score indicating an overall vulnerability of the system under test.

At step 311, the test sequence ends.

Figure 11:
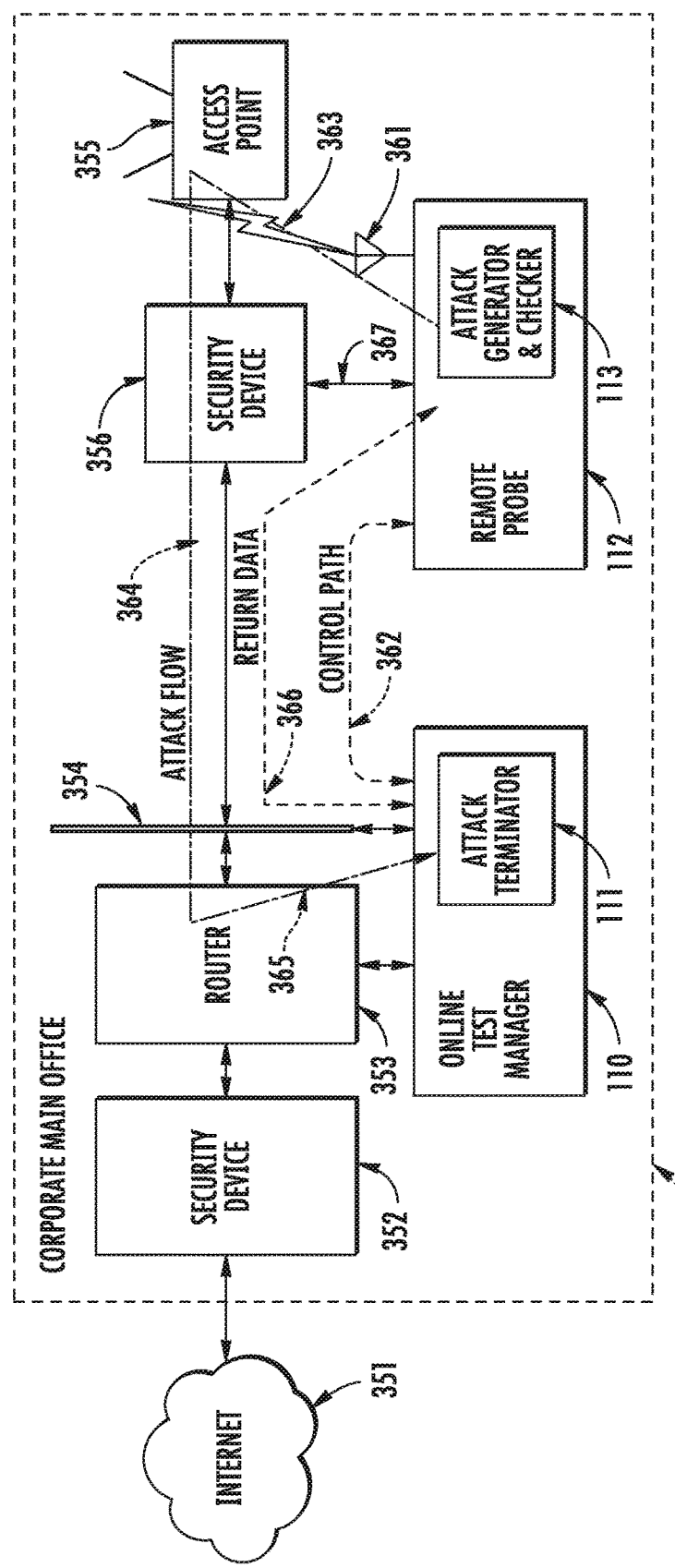
FIG. 11 shows an exemplary aspect of an online test manager and remote probe to assess the security of a corporate main office.

The teachings herein are not limited in application to performing distributed security tests at geographically separate locations. According to another aspect of the subject matter described herein, an online test manager and a remote probe may be used to conduct a security assessment inside a corporate main office. As shown in FIG. 11, corporate main office 350 may be connected to the Internet 351 via security device 352 that may protect router 353 and LAN 354 (with corporate resources attached thereto) against attackers from Internet 351. Access point 355 may provide wireless access, and may be connected to LAN 354 through security device 356. Security tests may be conducted on this network via online test manager 110 containing attack terminator 111, together with remote probe 112 containing attack generator and checker 113. Simulated wireless attack traffic 363 generated by attack generator and checker 113 may be injected into AP 355 via wireless antenna 361; alternatively, simulated wired attack traffic also generated by attack generator and checker 113 may be injected into security device 356 via wired link 367. If security device 356 is unable to detect or block the simulated attack traffic, attack flow 364 may reach router 353, and may be forwarded as flow 365 to attack terminator 111. Attack terminator 111 may then encapsulate and return the terminated packets as return data 366 to attack generator and checker 113, which may process and analyze the data to determine which simulated attacks succeeded or failed. Online test manager 110 may also download attack profiles and control the generation and checking of simulated attacks via control path 362.

Figure 1:
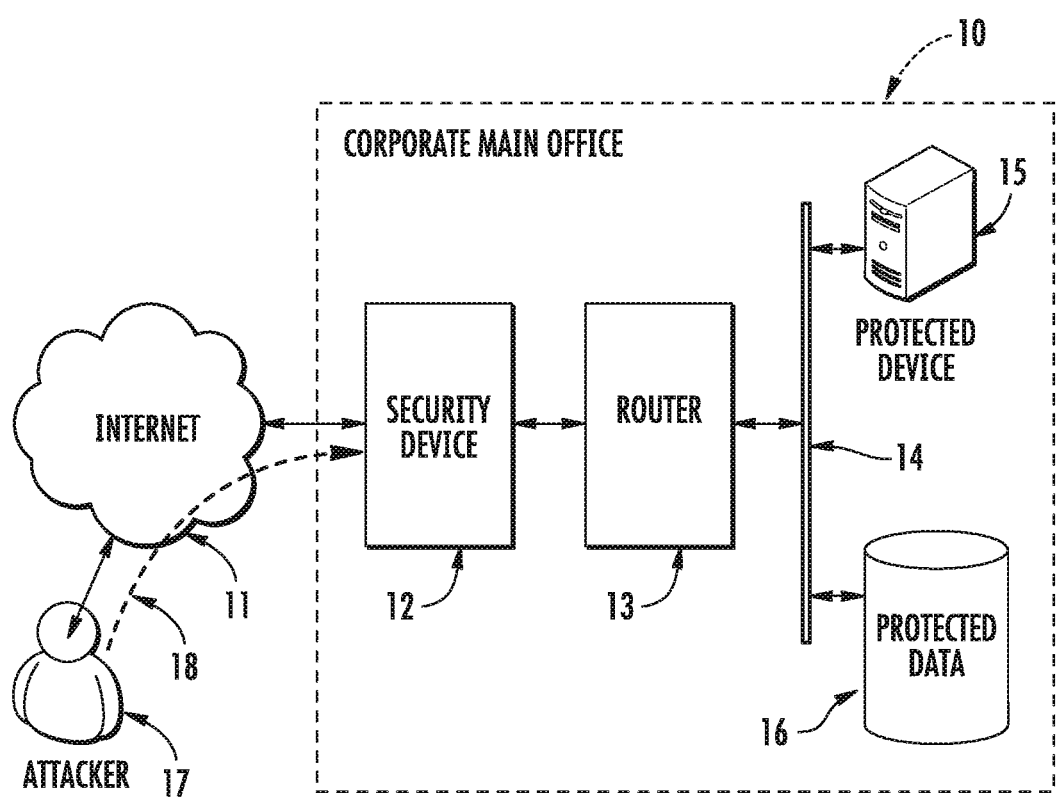
FIG. 1 shows a greatly simplified representation of a corporate main office with a security device defending data and devices to be protected against an attacker.
Figure 2:
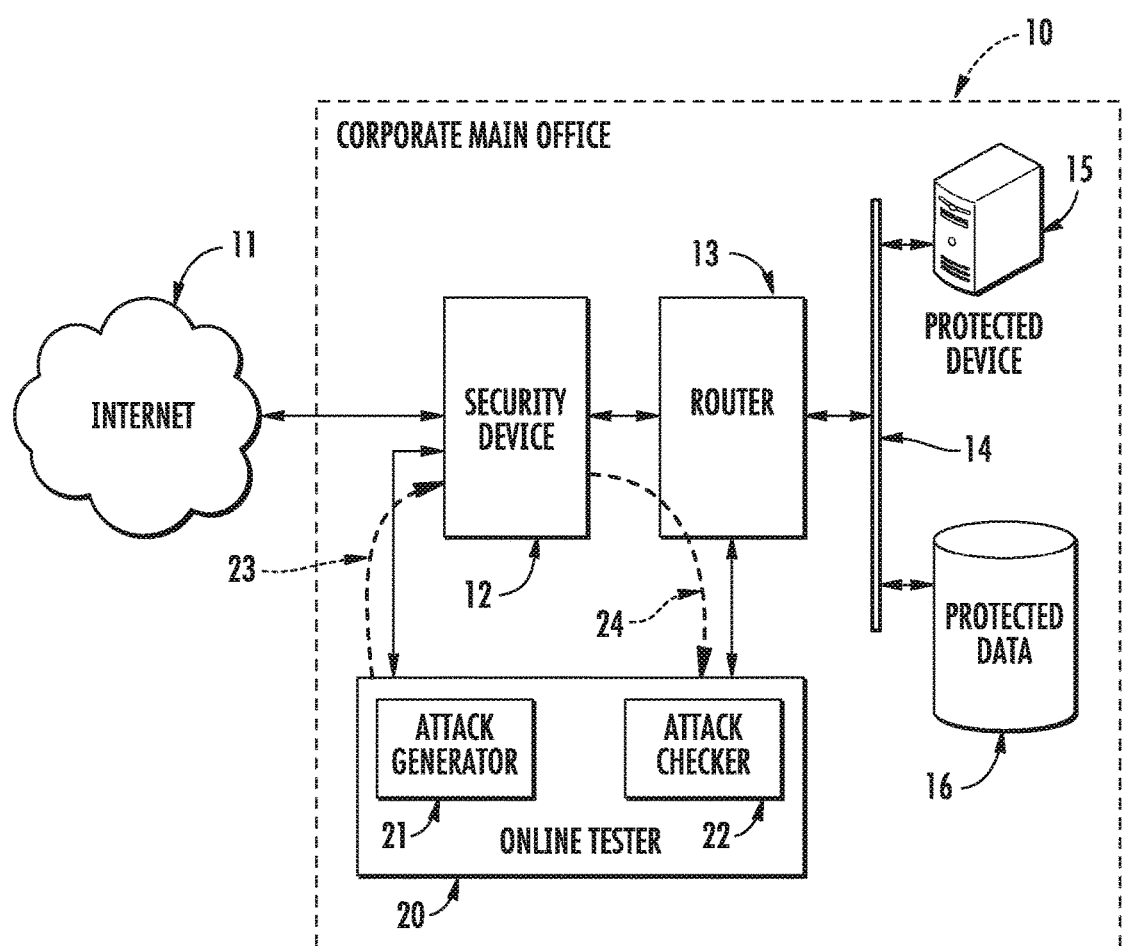
FIG. 2 represents a possible application of an online security tester at a corporate main office to assess the security posture of the enterprise.
Figure 3:
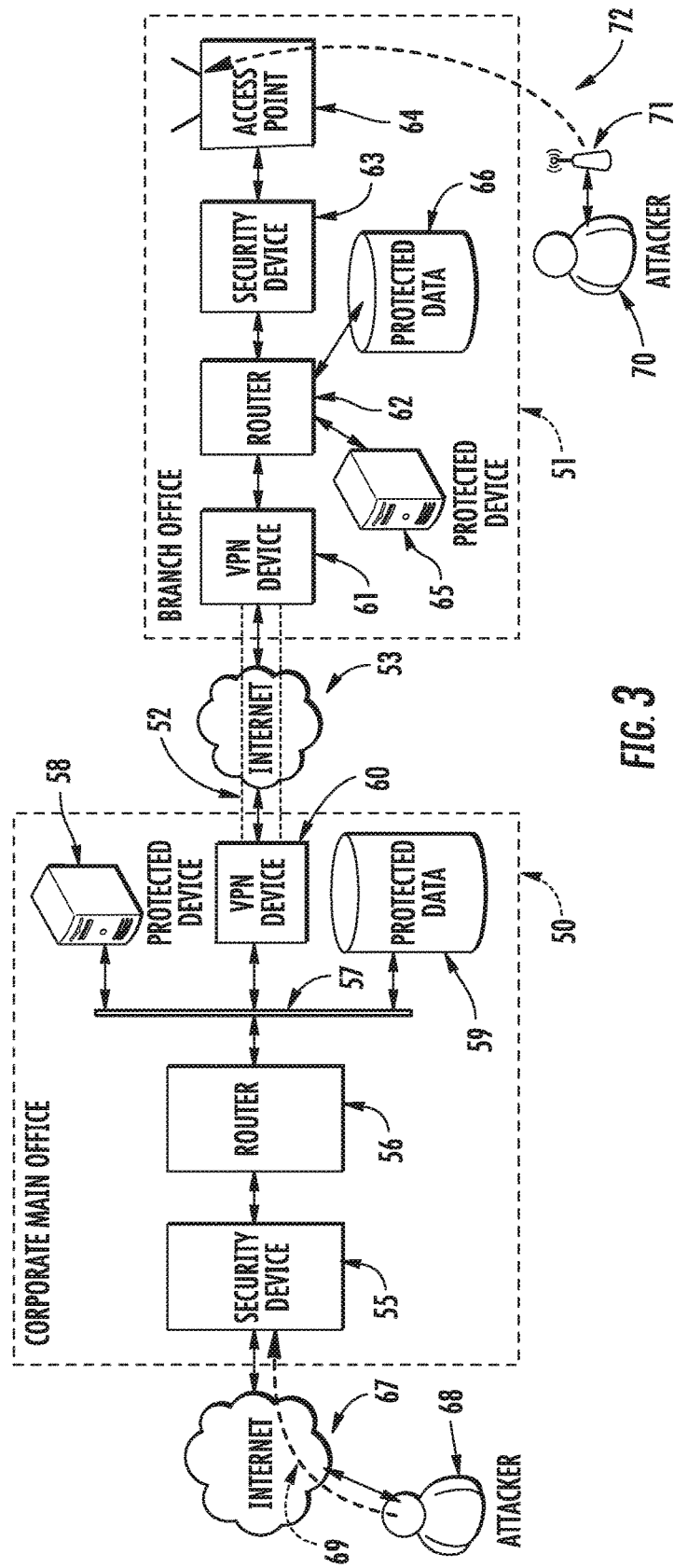
FIG. 3 depicts a simplified view of a corporate main office interconnected with a branch office and subject to attack from both the Internet and via the local wireless LAN.
Figure 4:
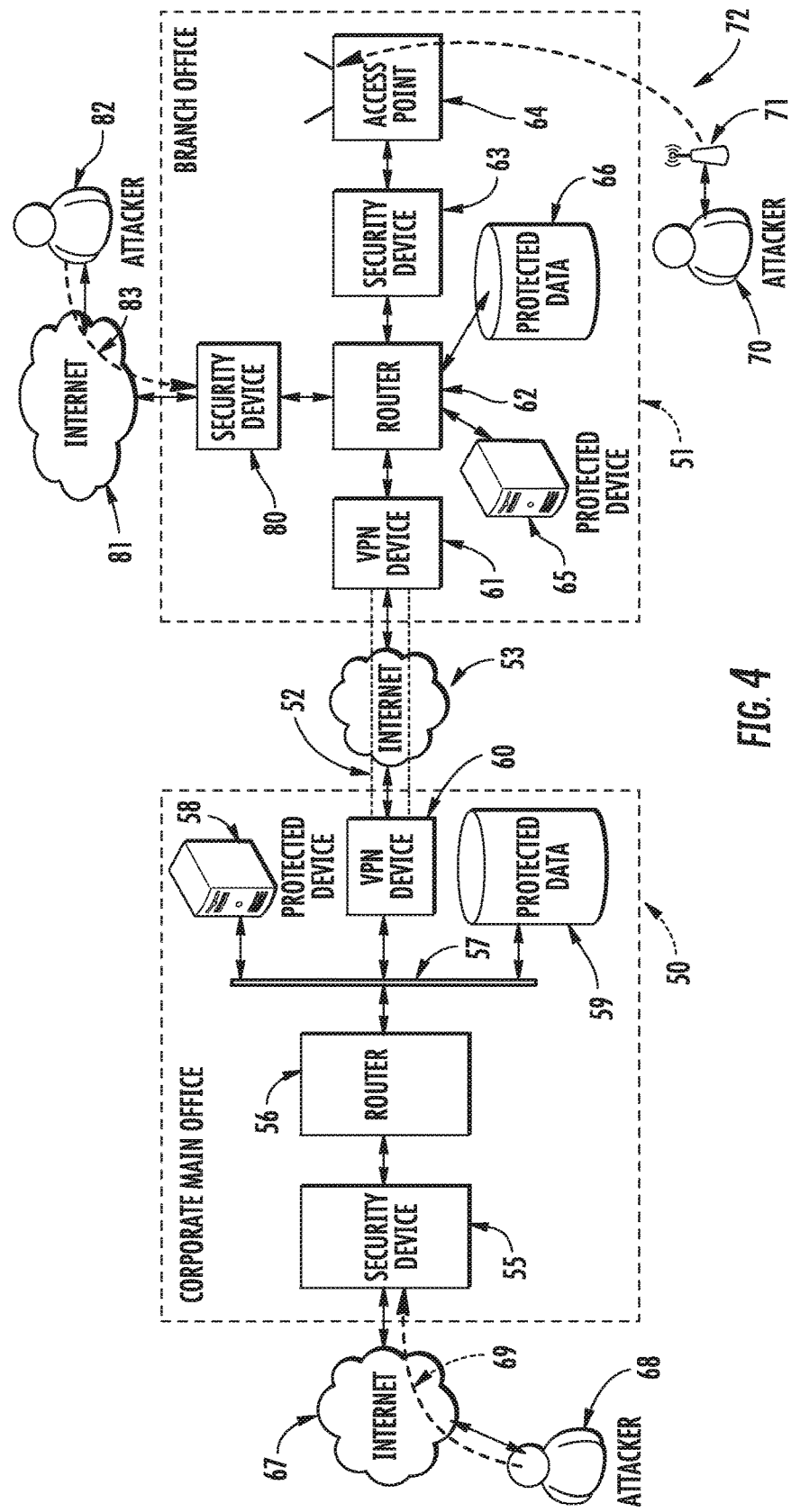
FIG. 4 depicts a view of a corporate main office interconnected with a branch office that has direct access to the Internet and is subject to attack from three fronts.

It is apparent that the arrangement of FIG. 11 may offer some advantages over a monolithic security test system, such as online tester 20 in FIG. 2. Remote probe 112 may be placed in any location within corporate main office 350, for example in areas that are difficult to access such as wiring closets or ceiling areas, while online test manager 357 may be placed in a central location such as a data center. This may enable increased flexibility, particularly in the case of wireless networks where APs may be placed in such difficult to access locations. Further, multiple remote probes may be managed and controlled from a single online test manager, increasing the scalability and coverage of the system. Finally, different kinds of remote probes may be integrated into the same system; for example, one set of remote probes may be wireless and used to conduct security tests on the WLAN, while another set of remote probes may be wired, and used to conduct security tests on the wired infrastructure.

Figure 12:
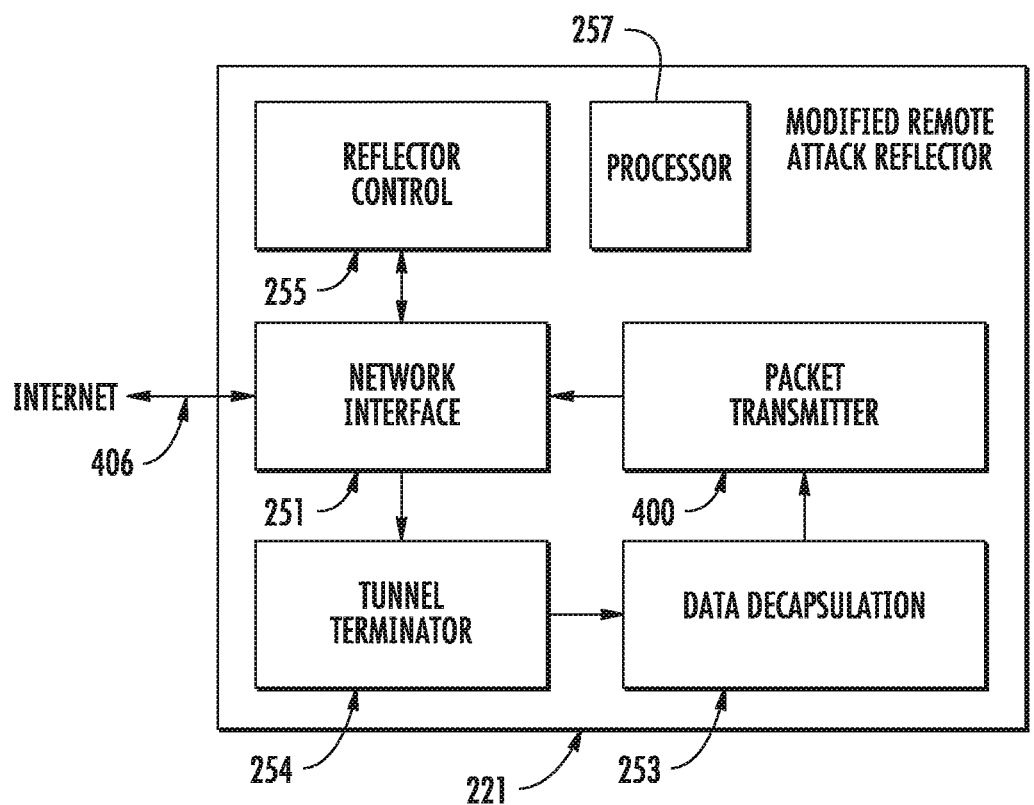
FIG. 12 represents a possible block diagram of a modified remote attack reflector that is configured to transmit security attack packets towards the SUT rather than receiving them from the SUT.

In accordance with another aspect of the subject matter described herein, a remote attack reflector may be modified to simulate attacks that originate from the Internet and are directed to a corporate main office or a remote branch office, instead of the arrangement of FIG. 8 wherein attacks are simulated that attempt to exfiltrate data from a remote branch office to the Internet. In this case, the attack traffic must appear to be generated from an Internet source, and terminate on an attack terminator, such as an attack terminator within an online test manager. An exemplary form of such a modified remote attack reflector may be as depicted in the block diagram in FIG. 12; modified remote attack reflector 221 may contain network interface 251 that may send or receive traffic via Internet link 406. Network interface 251 may receive encapsulated attack traffic from a remote probe (for example, remote probe 112 in FIG. 8) directed down a dedicated tunnel to modified remote attack reflector 221, and may pass the tunneled traffic to tunnel terminator 254, which may extract the encapsulated attack traffic from the dedicated tunnel and in turn pass it to data decapsulation function 253. Data decapsulation function 253 may decapsulate and extract the raw attack traffic and pass them to a packet transmitter 400, which may transmit a sequence of packets containing the attack traffic to a predetermined destination over the Internet via network interface 251.

An example of a predetermined destination may be an attack terminator, such as attack terminator 111 within online test manager 215 in FIG. 8. Attack terminator 111 may receive the attack traffic that may be transmitted by modified remote attack reflector 221, encapsulate it in the usual manner, and may transfer it to remote probe 112. (Alternatively, an attack terminator may be integrated within remote probe 112 itself, simplifying the arrangement.) Simulated attack traffic that is generated by remote probe 112 and then encapsulated and sent via a dedicated tunnel to modified remote attack reflector 221 in this manner may thus take the appearance of originating from an actual attacker located on the Internet. If the simulated attack traffic succeeds in penetrating a security device (e.g., security device 218 in branch office 201 in FIG. 8) and making its way to either router 210 or router 206, then the network may be considered to have a vulnerability to a security attack mounted by an actual attacker.

It will be apparent to those of ordinary skill in the art that the embodiments and aspects described herein may be applicable to a number of situations and purposes. The combination of an online test manager and a remote probe, possibly including a remote attack reflector, may be deployed in a variety of topologies to mount simulated attacks against a wired and/or a wireless network to determine the security posture of the network. Multiple instances of remote probes (possibly with multiple network interfaces) may be utilized in conjunction with multiple instances of remote attack reflectors to direct simulated attack traffic at security devices in arbitrary ways. This may greatly increase the flexibility and capability of online security testing using simulated attack traffic.

It will be appreciated that, in accordance with embodiments described herein, it may be possible to provide the effect of separating the attack generator from the attack checker using an attack terminator to "loop" generated attack traffic back to the attack checker through encapsulation and a dedicated tunnel. Such separation may enable online security attack testing to be conducted in a system containing a corporate main office and one or more remote branch offices.

It will also be appreciated that, in accordance with aspects of embodiments described herein, it may be possible to provide the effect of "looping" generated attack traffic back from a suitable location on the Internet. As such, this may provide traffic flows similar to that encountered during data exfiltration attacks. This may simplify the task of securing facilities against data exfiltration.

It will further be appreciated that, in accordance with aspects of embodiments described herein, it may be possible to inject attack traffic into wireless devices and terminate the traffic on wired devices. This may enable the online testing of security posture for wireless LANs.

Accordingly, while the subject matter herein has been described with reference to illustrative embodiments, this description is not intended to be construed in a limiting sense. Various modifications of the illustrative embodiments, as well as other aspects or embodiments of the subject matter described herein, will be apparent to persons of ordinary skill in the art upon reference to this description. These modifications shall not be construed as departing from the scope of the subject matter described herein, which is defined solely by the claims appended hereto.

What is claimed is:

1. A distributed security tester for a System Under Test (SUT), comprising:
   a probe including at least one processor;
   an attack generator and checker co-located with said probe and implemented by the at least one processor and operative to generate simulated attack traffic for injection into said SUT to simulate a security attack on said SUT, and further to process simulated attack traffic that has passed through said SUT; and
   an online test manager device located remotely from the probe and including an attack terminator operative to receive said simulated attack traffic that has passed through said SUT from said SUT and operative to return, via a tunnel, said simulated attack traffic that has passed through said SUT from said attack terminator to said probe and said attack generator and checker, wherein said attack generator and checker is configured to operate in a separate physical location from said attack terminator, and wherein said online test manager instructs the probe to generate and inject said simulated attack traffic into said SUT via an access point local to said probe, wherein said simulated attack traffic is addressed to known target addresses within a network in which said online test manager device operates, the target addresses including an address of the online test manager device, wherein said simulated attack traffic passes through said access point, and at least some of said simulated attack traffic passes through a security device in a first office location of said SUT, from the first office location of said SUT to a second office location of said SUT via a virtual private network (VPN) link, and to said attack terminator, wherein said attack terminator returns said at least some simulated attack traffic from said second office location of said SUT to said first office location of said SUT via said tunnel over said VPN link, and to said remote probe and said attack generator and checker.

2. The distributed security tester of claim 1, further including a data encapsulation function operatively coupled to said attack terminator and operative to encapsulate said simulated attack traffic that has passed through said SUT in tunnel packets for return to said attack generator and checker via said tunnel.

3. The distributed security tester of claim 1, wherein said probe includes a wireless interface operatively coupled to said attack generator and checker and operative to inject said simulated attack traffic into said SUT via said access point, which comprises a wireless access point.

4. The distributed security tester of claim 1, wherein said probe includes a local attack database operatively coupled to said attack generator and checker for storing data usable to generate said simulated attack traffic.

5. The distributed security tester of claim 1 comprising a remote reflector operative to accept said simulated attack traffic and inject it into said SUT.

6. The distributed security tester of claim 5 wherein said remote reflector is configured to simulate an Internet-originating attack on said SUT.

7. The distributed security tester of claim 1 wherein said attack generator and checker injects said simulated attack traffic into said SUT.

8. The distributed security tester of claim 7 comprising a remote reflector, wherein said attack generator and checker simulates exfiltration of data by attempting to transmit simulated exfiltration traffic from within a protected network to said remote reflector and wherein said remote reflector is configured to transmit simulated exfiltration traffic that exits said protected network to said attack generator and checker.

9. The distributed security tester of claim 1 wherein said online test manager device configures said attack generator and checker to generate said simulated attack traffic.

10. A method of distributed security testing of a system under test (SUT), the method comprising:
    configuring an online test manager device located remotely from a probe which includes an attack generator and checker implemented on at least one processor of the probe to generate simulated attack traffic for injection into said SUT;
    configuring a remote attack terminator to receive simulated attack traffic that has passed through said SUT and to return said received traffic over a tunnel to said probe and said attack generator and checker;
    triggering said attack generator and checker to generate said simulated attack traffic for injection into said SUT; and
    wherein said simulated attack traffic represents a security attack test on said SUT, and wherein said online test manager instructs the probe to generate and inject said simulated attack traffic into said SUT via an access point local to said probe, wherein said simulated attack traffic is addressed to known target addresses within a network in which the online test manager operates, the target addresses including an address of the online test manager device, wherein said simulated attack traffic passes through said access point, and at least some of said simulated attack traffic passes through a security device in a first office location of said SUT, from the first office location of said SUT to a second office location of said SUT via a virtual private network (VPN) link, and to said attack terminator, wherein said attack terminator returns said at least some simulated attack traffic from said second office location of said SUT to said first office location of said SUT via said tunnel over said VPN link, and to said remote probe and said attack generator and checker.

11. The method of claim 10 comprising encapsulating said received traffic prior to returning it over said tunnel.

12. The method of claim 10 comprising downloading a plurality of security attack tests into a local database prior to said configuration of said attack generator and checker to generate said simulated attack traffic.

13. The method of claim 10 comprising providing a remote reflector operative to accept said simulated attack traffic and inject it into said SUT.

14. The method of claim 13 wherein said remote reflector is configured to simulate an Internet-originating attack on said SUT.

15. The method of claim 10 wherein said attack generator and checker injects said simulated attack traffic into said SUT.

16. The method of claim 15 comprising providing a remote reflector, wherein said attack generator and checker simulates exfiltration of data by attempting to transmit simulated exfiltration traffic from within a protected network to said remote reflector and wherein said remote reflector is configured to transmit simulated exfiltration traffic that exits said protected network to said attack generator and checker.

17. The method of claim 10 wherein said online test manager device configures said attack generator and checker to generate said simulated attack traffic.

18. A non-transitory computer readable medium having stored thereon executable instructions that, when executed by the processor of a computer, controls said computer to perform steps including:
  configuring online test manager device located remotely from a probe which includes an attack generator and checker implemented on at least one processor of the probe to generate simulated attack traffic for injection into a system under test (SUT);
  configuring a remote attack terminator to receive simulated attack traffic that has passed through said SUT, and to return said received traffic over a tunnel to said probe and said attack generator and checker;
  triggering said attack generator and checker to generate said simulated attack traffic for injection into said SUT; and wherein said simulated attack traffic represents a security attack test on said SUT, and wherein the online test manager device instructs the probe to generate and inject said simulated attack traffic into said SUT via an access point local to said probe, wherein said simulated attack traffic is addressed to known target addresses within a network in which online test manager operates, the target addresses including an address of the online test manager device, wherein said simulated attack traffic passes through said access point, and at least some of said simulated attack traffic passes through a security device in a first office location of said SUT, from the first office location of said SUT to a second office location of said SUT via a virtual private network (VPN) link, and to said attack terminator, wherein said attack terminator returns said at least some simulated attack traffic from said second office location of said SUT, to said first office location of said SUT via said tunnel over said VPN link, and to said remote probe and said attack generator and checker.

* * * * *